(12) United States Patent
Baumgaertner et al.

(10) Patent No.: US 10,589,820 B2
(45) Date of Patent: Mar. 17, 2020

(54) CONTROL METHOD AND CONTROL UNIT FOR ADAPTING A VELOCITY OF THE PUSHING AID OF AN ELECTRIC BICYCLE

(71) Applicant: Robert Bosch GmbH, Stuttgart (DE)

(72) Inventors: Daniel Baumgaertner, Tuebingen (DE); Rinaldo Greiner, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 91 days.

(21) Appl. No.: 15/609,617

(22) Filed: May 31, 2017

(65) Prior Publication Data
US 2017/0349236 A1    Dec. 7, 2017

(30) Foreign Application Priority Data

Jun. 1, 2016   (DE) .................. 10 2016 209 570

(51) Int. Cl.
| | |
|---|---|
| *B62M 6/00* | (2010.01) |
| *B62M 6/50* | (2010.01) |
| *B62M 6/55* | (2010.01) |
| *B62M 6/45* | (2010.01) |
| *B62M 6/70* | (2010.01) |
| *B62M 9/06* | (2006.01) |

(52) U.S. Cl.
CPC ............. *B62M 6/50* (2013.01); *B62M 6/45* (2013.01); *B62M 6/55* (2013.01); *B62M 6/70* (2013.01); *B62M 9/06* (2013.01)

(58) Field of Classification Search
None
See application file for complete search history.

(56) References Cited

U.S. PATENT DOCUMENTS

| | | | |
|---|---|---|---|
| 9,514,576 B2* | 12/2016 | Gerundt | B62J 99/00 |
| 9,522,713 B2* | 12/2016 | Stegmaier | B62M 6/50 |
| 9,550,489 B2* | 1/2017 | Voigtlaender | B60L 7/18 |
| 9,855,991 B2* | 1/2018 | Bendel | G01L 1/165 |

(Continued)

FOREIGN PATENT DOCUMENTS

| | | |
|---|---|---|
| DE | 20 2005 006 684 U1 | 9/2005 |
| DE | 601 10 853 T2 | 11/2005 |

(Continued)

*Primary Examiner* — Truc M Do
(74) *Attorney, Agent, or Firm* — Maginot, Moore & Beck LLP

(57) ABSTRACT

A control method comprises at least one detection of activation of the pushing aid. When activation is detected, in the subsequent step a velocity of the electric vehicle and/or a constant starting torque are/is generated by actuation of the electric motor. The generated velocity of the pushing aid as a result of the actuation is dependent on the engaged transmission ratio of the gearshift. In order to adapt the velocity, the control method comprises sensing the current motor rotational speed of the electric motor and sensing the current velocity of the electric bicycle. The engaged transmission ratio is determined as a function of the sensed motor rotational speed and the sensed velocity. The adaptation of the velocity of the electric bicycle occurs in the subsequent step as a result of regulation of the electric motor as a function of the transmission ratio and the maximum velocity, which is not exceeded.

4 Claims, 4 Drawing Sheets

(56) References Cited

U.S. PATENT DOCUMENTS

| | | | |
|---|---|---|---|
| 2005/0067207 A1* | 3/2005 | Radtke | B62M 6/45 180/223 |
| 2005/0077096 A1* | 4/2005 | Kokatsu | B62M 6/45 180/207.1 |
| 2007/0213150 A1* | 9/2007 | Chattin | B62M 9/123 474/82 |
| 2013/0110335 A1* | 5/2013 | Durdevic | B62M 6/45 701/22 |
| 2013/0311019 A1* | 11/2013 | Tanaka | B62M 6/45 701/22 |
| 2014/0135159 A1* | 5/2014 | Yang | F16H 9/04 474/148 |
| 2014/0138174 A1* | 5/2014 | Getta | B62M 6/55 180/220 |
| 2015/0094890 A1* | 4/2015 | Dasbach | B62M 6/50 701/22 |
| 2015/0292934 A1* | 10/2015 | Baumgaertner | B62M 6/50 701/22 |
| 2016/0107720 A1* | 4/2016 | Xu | B62M 6/50 475/4 |
| 2016/0121963 A1* | 5/2016 | Tanaka | B60L 7/10 701/22 |

FOREIGN PATENT DOCUMENTS

| | | |
|---|---|---|
| DE | 20 2005 018 126 U1 | 3/2006 |
| DE | 10 2015 110 145 A1 | 12/2015 |
| DE | 10 2015 110 317 A1 | 1/2016 |
| EP | 2 957 449 A1 | 12/2015 |
| FR | 2 768 991 A1 | 4/1999 |
| JP | H-11124076 A | 5/1999 |
| JP | 2012-030767 A | 2/2012 |
| JP | 2015-145238 A | 8/2015 |

* cited by examiner

CONTROL METHOD AND CONTROL UNIT FOR ADAPTING A VELOCITY OF THE PUSHING AID OF AN ELECTRIC BICYCLE

This application claims priority under 35 U.S.C. § 119 to application no. DE 10 2016 209 570.6, filed on Jun. 1, 2016 in Germany, the disclosure of which is incorporated herein by reference in its entirety.

BACKGROUND

The present disclosure relates to a control method for adapting a velocity of the pushing aid of an electric bicycle and to a control unit which is configured to carry out this method. The disclosure also relates to an electric bicycle having the control unit.

Documents DE 20 2005 018 126 U1 and DE 20 2005 006 684 U1 each describe a starting aid operating mode for an electric bicycle, wherein the starting aid can also be used as a pushing aid. The starting aid is activated by actuation of a switch on the handlebars. As a result of the activation, the electric motor generates a torque for driving the electric bicycle without pedalling assistance by the cyclist. This results in a velocity of the electric bicycle which is just below or equal to the legally prescribed maximum velocity for a starting aid or pushing aid. In document DE 20 2005 018 126 U1 the electric vehicle additionally has a gearshift for changing the transmission ratio between the pedal crank axis and the rear wheel axis. In order to generate a defined velocity of the starting aid, there is a changeover to a known transmission ratio of the gearshift.

SUMMARY

The present disclosure relates to a control method for adapting a velocity of the pushing aid without shifting into a known transmission ratio of a gearshift of the electric bicycle taking place. The disclosure also relates to a control unit which is configured to carry out the control method, and to an electric bicycle having the control unit.

The electric bicycle comprises at least one electric motor for driving the electric bicycle, a controller for actuating the electric motor, and a gearshift for changing the transmission ratio between the pedal crank axle and the rear wheel axle. Furthermore, the electric bicycle has a sensor for sensing the current velocity of the electric bicycle. The sensor is preferably a Reed sensor which typically has a magnet on a spoke of a running wheel. A Reed sensor requires one to two complete revolutions of the wheel or two Reed pulses to sense the velocity. Alternatively, the sensor can comprise a GPS sensor. In order to sense the velocity of the pushing aid more quickly, the sensor can alternatively have an acceleration sensor. The electric bicycle is configured to carry out the control method according to the disclosure.

The control method for the pushing aid of an electric bicycle comprises at least one detection of activation of the pushing aid. When actuation is detected, in the subsequent step a constant starting torque is generated by actuation of the electric motor, as a result of which the electric bicycle is accelerated and a velocity of the electric bicycle results. The actuation of the electric motor to generate the constant starting torque takes place as a function of a maximum velocity for a pushing aid which is, for example, legally prescribed as 6 km/h in Germany. The resulting velocity is also dependent on the engaged transmission ratio of the gearshift or of the gear mechanism. In order to adapt the velocity the control method comprises sensing a current motor rotational speed of the electric motor and sensing the current velocity of the electric bicycle. The engaged transmission ratio of the gearshift or of the gear mechanism is determined as a function of the sensed motor rotational speed and the sensed velocity. The velocity of the electric bicycle is adapted in the subsequent step by regulating the electric motor as a function of the determined transmission ratio and the maximum velocity, which is not exceeded. As a result of the control method according to the disclosure, a comfortable pushing aid for the electric bicycle results, wherein the velocity of the pushing aid is approximated to the maximum velocity for a pushing aid. Furthermore, compared to the prior art there is no need to change over into a defined transmission ratio of the gearshift for the pushing aid.

In one development of the disclosure, the activation of the pushing aid is detected automatically if an acceleration of the electric bicycle in the forward direction and a velocity of less than 6 km/h are sensed and no pedalling frequency of the cyclist and no weight loading on the saddle of the electric vehicle are detected. The automatic activation of the pushing aid increases the comfort and the safety of the pushing aid because, for example, both hands can be used to steer the electric bicycle and the cyclist's attention can be directed unimpeded at the road traffic.

The control unit according to the disclosure comprises at least one computing unit which detects the activation of the pushing aid. When activation is detected, a control signal for the electric motor for generating the constant starting torque is output. Subsequently, the computing unit senses the current motor rotational speed of the electric motor and the current velocity of the electric bicycle. The computing unit regulates the control signal for the electric motor as a function of the sensed motor rotational speed and the sensed velocity and/or as a function of the determined transmission ratio of the gearshift and the maximum velocity of the pushing aid in order to adapt the velocity of the electric bicycle.

BRIEF DESCRIPTION OF THE DRAWINGS

The present disclosure will be explained below on the basis of preferred embodiments and appended drawings, in which.

DETAILED DESCRIPTION

Figure 1:
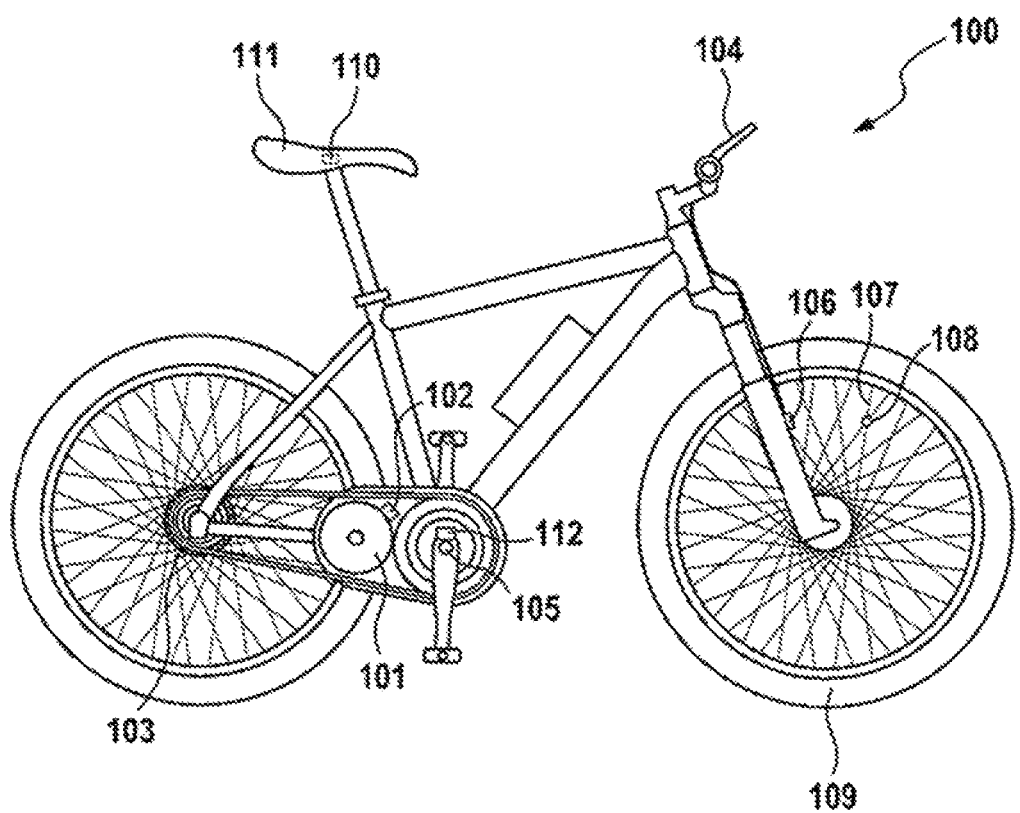
FIG. 1 shows an electric bicycle.

FIG. 1 is an outline of an electric bicycle 100. The electric bicycle 100 has an electric motor 101 and a control unit 104 for actuating the electric motor 101. Furthermore, a gearshift 103 or a gear mechanism for changing the transmission ratio between the pedal crank axle 105 and the electric motor 101 and the rear wheel axle is arranged on the electric bicycle 100. The electric bicycle 100 also has at least one sensor 106 for sensing the current velocity of the electric bicycle 100. This sensor 106 can be, for example, a Reed sensor, wherein a magnet 108 of the sensor 106 is arranged on at least one spoke 107 of a wheel 109 of the electric bicycle 100. Alternatively, the sensor 106 can be a GPS sensor or an acceleration sensor, wherein the GPS sensor and/or the acceleration sensor are preferably arranged in the control unit 104. The electric bicycle 100 can optionally have a further sensor 102 for sensing the motor rotational speed n of the electric motor 101 and/or an additional sensor 110 for sensing the weight loading on the saddle 111 and/or a sensor 112 for sensing the pedalling frequency at the pedal crank axle 105.

Figure 2:
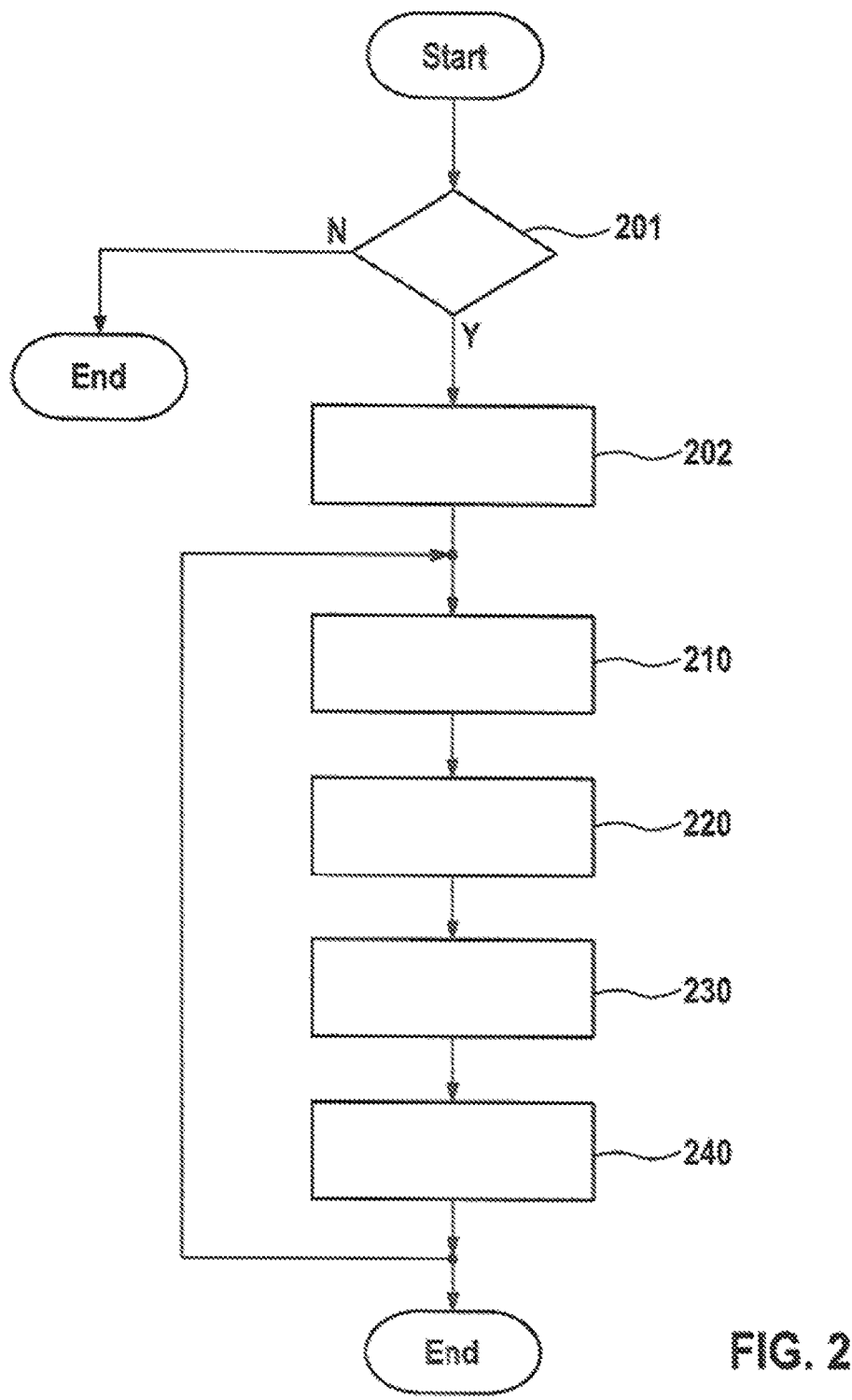
FIG. 2 shows a flow chart of the control method for the pushing aid.

FIG. 2 illustrates a flow chart of the method according to the disclosure. Firstly, a detection 201 of an activation of the pushing aid takes place. If no activation has been detected, the further steps of the control method for the pushing aid are not carried out. The detection 201 of the activation can take place, for example, by sensing a manual input of the cyclist or a manual actuation of a switch. In a development of the disclosure, the detection 201 of the activation of the pushing aid takes place automatically by means of an evaluation of at least one measurement variable of at least one sensor, wherein a plurality of sensor variables are preferably evaluated. For example, the automatic detection 201 takes place by means of the sensors 106, 110 and 112 if an acceleration of the electric bicycle in the forward direction and a velocity of less than 6 km/h are sensed and no pedalling frequency of the cyclist and no weight loading on the saddle of the electric bicycle are detected.

If the activation of the pushing aid has been detected in step 201, in the next step 202 a constant starting torque for driving the electric bicycle is generated by actuating the electric motor. This results in a velocity of the electric bicycle. A legally prescribed, country-specific maximum velocity for the pushing aid of the electric vehicle 100 must not be exceeded. This maximum velocity is 6 km/h in Germany. Since the highest engaged transmission ratio is assumed during the actuation 202 with the constant starting torque, a velocity of less than or equal to the maximum velocity for the pushing aid always results. When a transmission ratio i which is less than the highest transmission ratio $i_{max}$, i.e. $i<i_{max}$, is engaged, for example a velocity of 2 km/h is generated. Subsequently, sensing 210 of a current motor rotational speed n of the electric motor and sensing 220 of the current velocity v of the electric bicycle take place. The current velocity v is sensed, for example, by a Reed sensor or a GPS sensor. Alternatively, the sensing 230 of the velocity v of the electric bicycle takes place by integrating sensed acceleration values of the electric bicycle in the forward direction or by means of a Reed sensor by excluding high velocities as an estimate. In the following step 230, the engaged transmission ratio i of the gearshift is determined as a function of the sensed motor rotational speed n and the sensed velocity v. The determination 230 of the engaged transmission ratio i can take place, for example, according to equation (1), wherein the transmission ratio i* between the electric motor and the pedal crank axle and the external wheel circumference U of one of the running wheels are taken into account.

$$i = \frac{v}{n \cdot i^* \cdot U} \tag{1}$$

In the following step, a regulating 240 of the electric motor for adapting the velocity of the electric bicycle as a function of the determined transmission ratio i and the maximum velocity for the pushing aid is carried out. In this context, the velocity v is, in particular, increased, wherein a legally prescribed maximum velocity $v_{max}$ is not exceeded.

By repeating the steps after the actuation 202, the velocity v of the pushing aid is adapted in multiple stages. For example, in a first run of the control method the sensing 220 of the velocity v takes place by means of an acceleration sensor. By integrating the sensed acceleration values of the electric bicycle over time in the forward direction, the speed is determined quickly but relatively imprecisely. As a result of the regulating 240 of the electric motor as a function of the determined velocity, the velocity of the pushing aid is adapted shortly after the start of the pushing aid. Owing to the imprecision of the determination of the velocity on the basis of the sensed acceleration values, this regulating 240 can additionally take place as a function of a safety factor $c_s$, which results in a velocity of the pushing aid which is clearly below the maximum velocity. After the sensing of the current velocity v by means of a Reed sensor or GPS sensor, i.e. after the second Reed pulse, the steps after the actuation 202 are repeated. The velocity v of the pushing aid can therefore be increased in a stepped fashion by the control method without the maximum velocity being exceeded.

Figure 3:
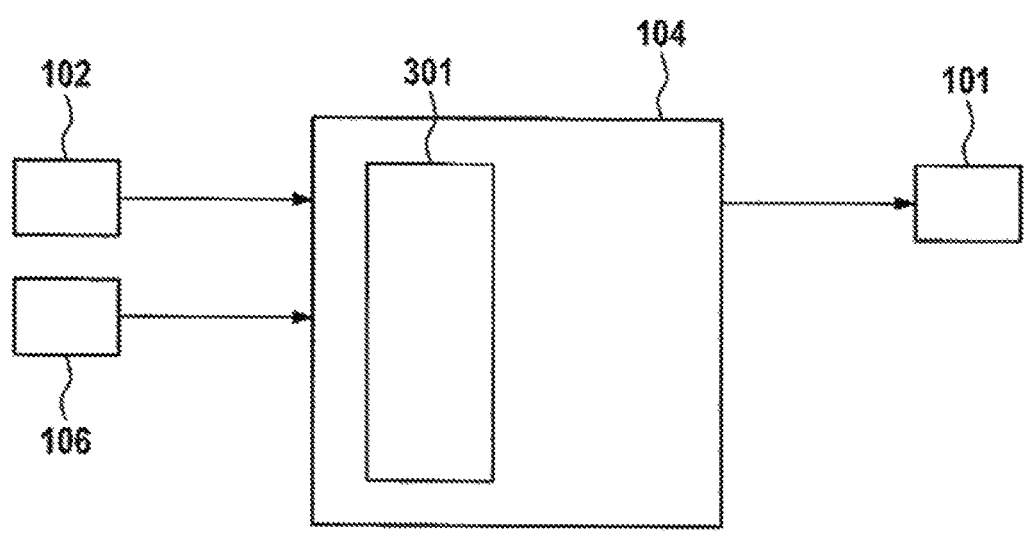
FIG. 3 shows a control unit.

FIG. 3 illustrates the control unit 104 according to the disclosure. The control unit 104 is configured to carry out the control method for the pushing aid. Said control unit 104 comprises a computing unit 301. The computing 301 detects activation of the pushing aid and when activation is detected generates a control signal for the electric motor. By means of the control signal, a constant starting torque $M_{start}$ of the electric motor 101 is generated as a function of the maximum velocity $v_{max}$. The computing unit 301 also senses a variable, representing the current velocity v of the electric bicycle, from the sensor 106 and a variable which represents the current motor rotational speed n of the electric motor 101. The computing unit 301 regulates the control signal for the electric motor 101 as a function of the sensed velocity v and the sensed motor rotational speed n.

Figure 4:
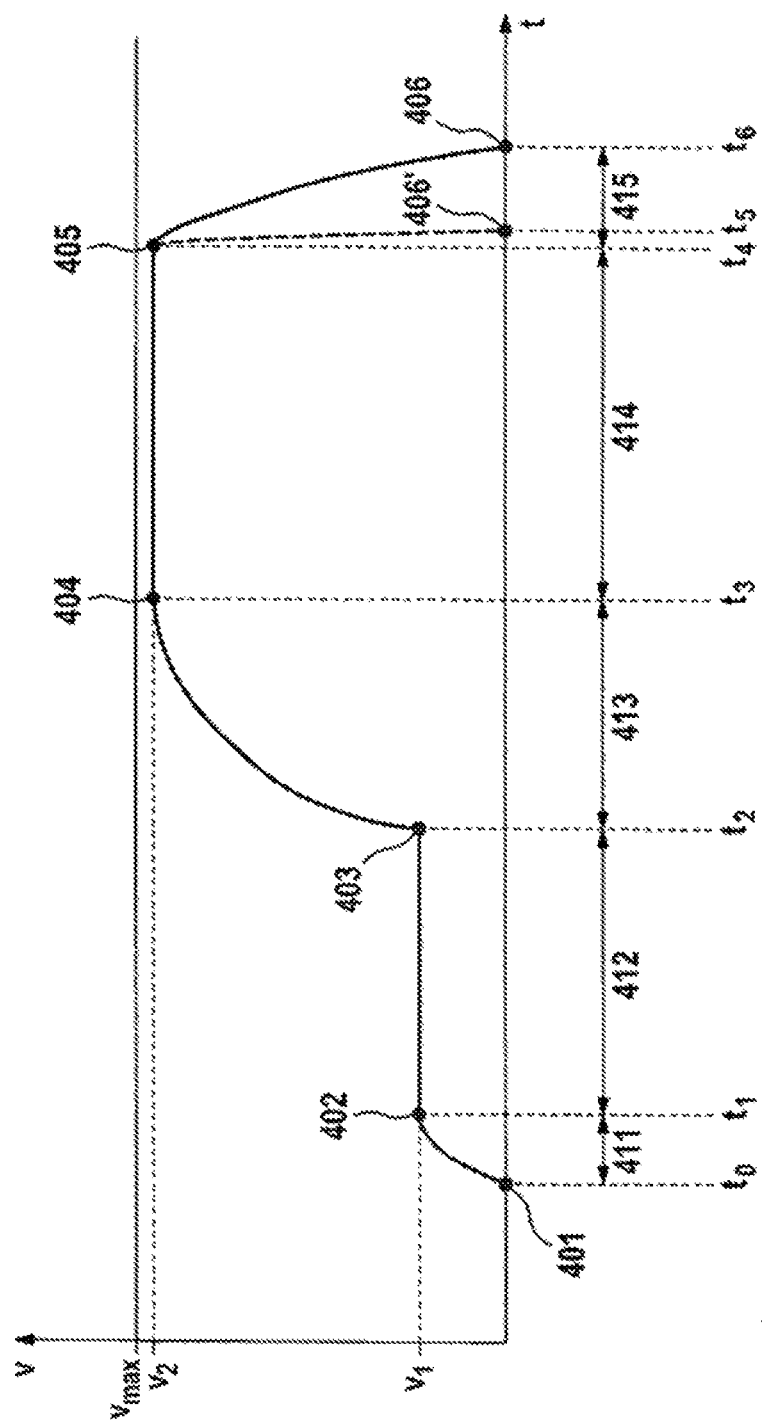
FIG. 4 shows a diagram of the adaptation of the velocity by the control method

FIG. 4 illustrates an exemplary embodiment of the control method as a diagram. At the time $t_0$, activation of the pushing aid is detected at the point 401 and subsequently a constant starting torque $M_{start}$ of the electric motor is generated from the time $t_0$ to the time $t_1$ in the range 411. In order to avoid the maximum velocity $v_{max}$ being exceeded by the constant starting torque $M_{start}$ in the range 411 during the acceleration of the electric bicycle it is assumed that the engaged transmission ratio i corresponds to the highest transmission ratio $i_{max}$ of the gearshift or of the gear mechanism. The velocity $v_1$ which is reached at the time $t_1$ at the point 402 is in this example lower than the maximum velocity $v_{max}$ because the engaged transmission ration is lower than the highest transmission ration ($i<i_{max}$). The electric bicycle travels at the constant velocity $v_1$ from the time $t_1$ to the time $t_2$, i.e. in the range 412, wherein the current velocity $v_1$ and the current motor rotational speed n are sensed. Up to the time $t_2$, see point 403, the transmission ratio is determined as a function of the sensed velocity v and the sensed motor rotational speed n. At the time $t_2$, the regulating process of the electric motor takes place as a function of the determined transmission ratio, as a result of which the generated starting torque of the electric motor is increased. As a result of the increased torque of the electric motor, the electric bicycle is accelerated up to the time $t_3$, i.e. in the range 413. This results in the velocity $v_2$ up to the time $t_3$ or the point 404, which velocity $v_2$ is, for example, just below the maximum velocity $v_{max}$. This velocity $v_2$ remains constant, for example up to the time $t_4$. They can alternatively be adapted again by the control method. At the time $t_4$ or at the point 405 the pushing aid is deactivated. As a result of the deactivation, the electric vehicle coasts to a standstill at the time $t_6$ or at the point 406, wherein the cyclist can brake the electric bicycle with a manual force. Alternatively, the electric bicycle is braked by the deactivation of the pushing aid and additionally by actuation of a mechanical brake or the actuation of the electric motor, with the result that after the deactivation the distance which is covered up to the time $t_5$ or the point 406' is minimized.

What is claimed is:

1. A control method for operating a pushing aid of an electric bicycle, the electric bicycle including at least one electric motor configured to drive the electric bicycle, a control unit, and a gearshift configured to change a transmission ratio between a pedal crank axle and a rear wheel axle, the method comprising:
    detecting an activation of the pushing aid; and
    in response to detecting the activation:
        generating a speed of the electric bicycle by controlling with the control unit the electric motor to a constant starting torque based upon an assumed transmission ratio between the pedal crank axle and the rear wheel axle, wherein the assumed transmission ratio is a highest provided transmission ratio between the pedal crank axle and the rear wheel axle;
        sensing, with the control unit, a motor rotational speed of the at least one electric motor;
        sensing, with the control unit, the velocity of the electric bicycle;
        determining, with the control unit, an engaged transmission ratio of the gearshift as a function of the sensed motor rotational speed and the sensed velocity; and
        adapting the velocity of the electric bicycle by regulating, with the control unit, the at least one electric motor as a function of the determined engaged transmission ratio and the maximum velocity of the pushing aid.

2. The control method according to claim 1, the detecting of the activation of the pushing aid further comprising:
    detecting the activation of the pushing aid automatically in response to (i) the sensed velocity of the electric bicycle being lower than 6 kilometers per hour, (ii) sensing an acceleration of the electric bicycle in a forward direction, (iii) detecting no pedalling frequency of the cyclist; and (iv) detecting no weight loading on a saddle of the electric bicycle.

3. A control unit for operating a pushing aid of an electric bicycle, the electric bicycle including at least one electric motor configured to drive the electric bicycle and a gearshift configured to change a transmission ratio between a pedal crank axle and a rear wheel axle, the control unit comprising:
    at least one computing unit configured to:
        detect an activation of the pushing aid; and
        in response to detecting the activation:
    generate a control signal configured to actuate the at least one electric motor as a function of a maximum velocity of the pushing aid to generate a velocity of the electric bicycle;
    sense a motor rotational speed of the at least one electric motor;
    sense the velocity of the electric bicycle;
    determine an engaged transmission ratio of the gearshift as a function of the sensed motor rotational speed and the sensed velocity; and
    adapt the velocity of the electric bicycle by regulating the control signal as a function of the determined engaged transmission ratio and the maximum speed of the pushing aid.

4. An electric bicycle comprising:
    at least one electric motor configured to drive the electric bicycle;
    a gearshift configured to change a transmission ratio between a pedal crank axle and a rear wheel axle;
    a sensor configured to sense a velocity of the electric bicycle; and
    a control unit having at least one computing unit configured to:
        detect an activation of a pushing aid; and
        in response to detecting the activation:
            generate a control signal configured to actuate the at least one electric motor as a function of a maximum velocity of the pushing aid to generate the velocity of the electric bicycle;
            sense a motor rotational speed of the at least one electric motor;
            sense, with the sensor, the velocity of the electric bicycle;
            determine an engaged transmission ratio of the gearshift as a function of the sensed motor rotational speed and the sensed velocity; and
            adapt the velocity of the electric bicycle by regulating the control signal as a function of the determined engaged transmission ratio and the maximum speed of the pushing aid.

* * * * *